(12) United States Patent
Forman (10) Patent No.: US 9,053,434 B2
(45) Date of Patent: Jun. 9, 2015

(54) DETERMINING AN OBVERSE WEIGHT

(71) Applicant: HEWLETT-PACKARD DEVELOPMENT COMPANY, L.P., Houston, TX (US)

(72) Inventor: George Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 278 days.

(21) Appl. No.: 13/842,461

(22) Filed: Mar. 15, 2013

(65) Prior Publication Data

US 2014/0279742 A1   Sep. 18, 2014

(51) Int. Cl.
G06F 15/18 (2006.01)
G06N 5/02 (2006.01)
G06N 99/00 (2010.01)

(52) U.S. Cl.
CPC .................................. *G06N 99/005* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 7,792,353 | B2* | 9/2010 | Forman et al. | 382/159 |
| 8,086,549 | B2 | 12/2011 | Qi et al. | |
| 8,180,715 | B2* | 5/2012 | Forman | 706/12 |
| 8,208,726 | B2* | 6/2012 | Eshghi et al. | 382/177 |
| 8,266,179 | B2* | 9/2012 | Forman et al. | 707/791 |
| 8,311,957 | B2* | 11/2012 | Kirshenbaum et al. | 706/12 |
| 8,352,396 | B2* | 1/2013 | Forman et al. | 706/45 |
| 8,355,997 | B2* | 1/2013 | Kirshenbaum et al. | 706/12 |
| 8,463,041 | B2* | 6/2013 | Eshghi et al. | 382/180 |
| 8,627,403 | B1* | 1/2014 | Kirshenbaum et al. | 726/1 |
| 8,719,201 | B2* | 5/2014 | Forman et al. | 706/45 |
| 8,825,570 | B2* | 9/2014 | Forman | 706/12 |
| 8,856,123 | B1* | 10/2014 | Forman | 707/737 |
| 2011/0295778 | A1 | 12/2011 | Homma et al. | |
| 2013/0031518 | A1 | 1/2013 | Robles et al. | |

FOREIGN PATENT DOCUMENTS

EP            2182458 A1      5/2010

OTHER PUBLICATIONS

Accurate Estimate of the Cross-Validated Prediction Error Variance in Bayes Classifiers, Ververidis, D. ; Kotropoulos, C. Machine Learning for Signal Processing, 2007 IEEE Workshop on DOI: 10.1109/MLSP.2007.4414332 Publication Year: 2007 , pp. 354-359.*

Density-Preserving Sampling: Robust and Efficient Alternative to Cross-Validation for Error Estimation, Budka, M. ; Gabrys, B. Neural Networks and Learning Systems, IEEE Transactions on vol. 24 , Issue: 1 DOI: 10.1109/TNNLS.2012.2222925 Publication Year: 2013 , pp. 22-34.*

Statistical Analysis of Minimum Classification Error Learning for Gaussian and Hidden Markov Model Classifiers, Afify, M. ; Xinwei Li ; Hui Jiang Audio, Speech, and Language Processing, IEEE Transactions on vol. 15 , Issue: 8 DOI: 10.1109/TASL.2007.903304 Publication Year: 2007 , pp. 2405-2417.*

(Continued)

*Primary Examiner* — Michael B Holmes
(74) *Attorney, Agent, or Firm* — Hewlett-Packard Patent Department (57) ABSTRACT

A technique for determining an obverse weight. A set of cases can be divided into bins. An obverse weight for a bin can be determined based on an importance weight of the bin and a variance of an error estimate of the bin.

18 Claims, 4 Drawing Sheets

(56) References Cited

OTHER PUBLICATIONS

Early stopping for non-parametric regression: An optimal data-dependent stopping rule, Raskutti, G. ; Wainwright, M.J. ; Bin Yu Communication, Control, and Computing (Allerton), 2011 49th Annual Allerton Conference on DOI: 10.1109/Allerton.2011.6120320 Publication Year: 2011 , pp. 1318-1325.*

Krogh, A et al, "Neural Network Ensembles, Cross Validation and Active Learning" 1995.

* cited by examiner

| Bins | Test cases | Population cases | Importance weight | Errors | Error estimate | Variance in r | Obverse weight | Notes |
|---|---|---|---|---|---|---|---|---|
| b | t | p | w | e | r | v | m | n |
| 0 | 4 | 120 | 30.0 | 0 | 0.0% | 4.69% | 42.19 | [A] |
| 0.05 | 17 | 850 | 50.0 | 0 | 0.0% | 0.51% | 12.67 | [B] |
| 0.1 | 53 | 2650 | 50.0 | 1 | 1.9% | 0.09% | 2.35 | [B] |
| 0.15 | 129 | 6450 | 50.0 | 15 | 11.6% | 0.09% | 2.16 | [B] |
| 0.2 | 241 | 12050 | 50.0 | 21 | 8.7% | 0.04% | 0.88 | [B] |
| 0.25 | 352 | 7000 | 19.9 | 30 | 8.5% | 0.02% | 0.09 | [C] |
| 0.3 | 398 | 5400 | 13.6 | 31 | 7.8% | 0.02% | 0.03 | |
| 0.35 | 352 | 3520 | 10.0 | 34 | 9.7% | 0.03% | 0.03 | |
| 0.4 | 241 | 2420 | 10.0 | 21 | 8.7% | 0.04% | 0.04 | |
| 0.45 | 129 | 1340 | 10.4 | 8 | 6.2% | 0.05% | 0.06 | |
| 0.5 | 54 | 650 | 12.0 | 5 | 9.3% | 0.20% | 0.28 | |
| 0.55 | 22 | 410 | 18.6 | 6 | 27.3% | 0.97% | 3.36 | [D] |
| 0.6 | 16 | 390 | 24.4 | 5 | 31.3% | 1.42% | 8.45 | [D] |
| 0.65 | 24 | 390 | 16.3 | 8 | 33.3% | 0.96% | 2.53 | [D] |
| 0.7 | 35 | 350 | 10.0 | 10 | 28.6% | 0.61% | 0.61 | [D] |
| 0.75 | 39 | 390 | 10.0 | 5 | 12.8% | 0.35% | 0.35 | |
| 0.8 | 35 | 350 | 10.0 | 3 | 8.6% | 0.32% | 0.32 | |
| 0.85 | 24 | 600 | 25.0 | 2 | 8.3% | 0.51% | 3.19 | |
| 0.9 | 12 | 280 | 23.3 | 1 | 8.3% | 1.27% | 6.91 | |
| 0.95 | 8 | 160 | 20.0 | 1 | 12.5% | 2.34% | 9.38 | |
| 1 | 5 | 14 | 2.8 | 1 | 20.0% | 4.44% | 0.35 | [E] |

DETERMINING AN OBVERSE WEIGHT

BACKGROUND

In machine learning, developing a classifier can involve training and testing the classifier on labeled cases. Testing the classifier can be performed to determine an estimate of the generalization error of the classifier. The generalization error indicates how well a classifier is expected to perform on cases unseen during training of the classifier. However, obtaining labeled cases can be an expensive, time-consuming, and difficult task.

BRIEF DESCRIPTION OF DRAWINGS

The following detailed description refers to the drawings, wherein:

FIG. 3($a$) illustrates a method of selecting a case for testing based on obverse weights, according to an example.

FIG. 3($b$) illustrates a method of selecting a case for testing based on obverse weights, according to an example.

DETAILED DESCRIPTION

According to an embodiment, an obverse weight may be determined to aid in selecting cases to include in a test set. The obverse weight may indicate an importance of selecting a case from a particular area of a case population for the purpose of improving an estimate of the generalization error of a classifier. The obverse weight may be determined based on an importance weight and a variance of an error estimate associated with a particular area of the case population. After selection of a case based on obverse weight, the case may be assigned a label (if it is unlabeled) and added to the test set. The augmented test set may then be used to test the classifier. Results of the testing may be used to estimate the generalization error of the classifier.

By selecting additional cases for a test set based on the obverse weight, portions of the case population more likely to impact the accuracy of the estimate of the generalization error may be included in the test set. As a result, a person may be more confident in the estimate of the generalization error of a classifier intended for production. Furthermore, since the case selection may be more efficient (e.g., the selected cases are expected to improve the estimate of the generalization error more quickly), fewer cases may be required to achieve an appropriate estimate. Accordingly, the time, expense, and difficulty associated with obtaining labeled cases may be reduced. Additional examples, advantages, features, modifications and the like are described below with reference to the drawings.

Figure 1:
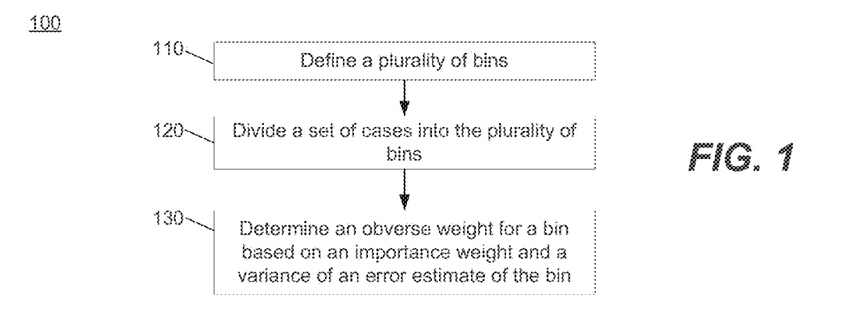
FIG. 1 illustrates a method of determining an obverse weight, according to an example.

FIG. 1 illustrates a method of determining an obverse weight, according to an example. Method 100 may be performed by a computing device, system, or computer, such as computing system 500 or computer 600. Computer-readable instructions for implementing method 100 may be stored on a computer readable storage medium. These instructions as stored on the medium are referred to herein as "modules" and may be executed by a computer.

Method 100 may begin at 110, where a plurality of bins may be defined. A bin is an area or portion of a case population. Cases within the case population are considered to be in a particular bin if the case falls within the established boundaries of the bin. The bin (or the boundaries of the bin) may be defined based on one or more characteristics of cases in a case population.

Figure 2:
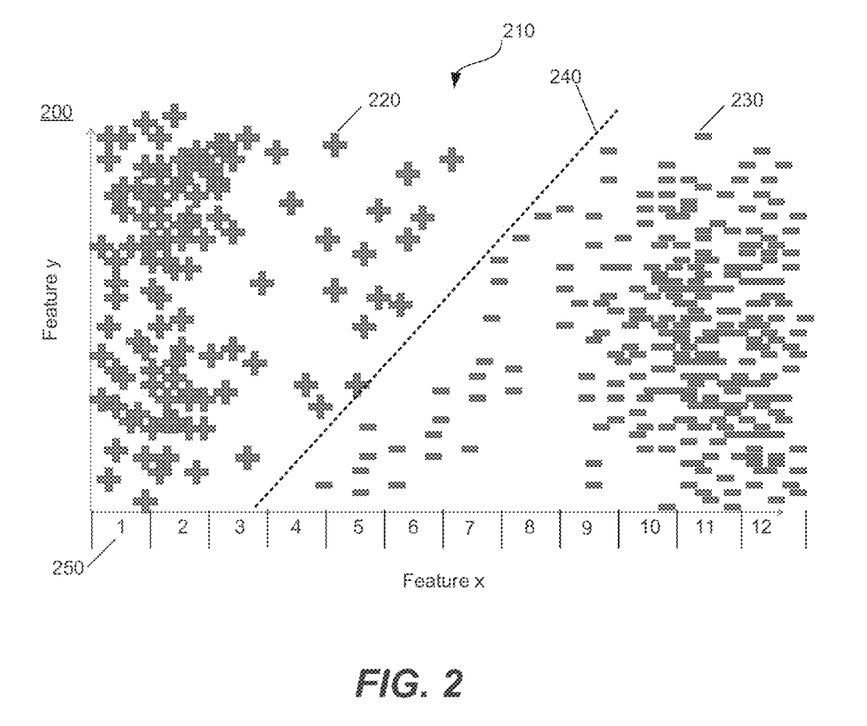
FIG. 2 illustrates an example of a case population divided into bins, according to an example.

Cases in a case population may be associated with feature vectors that define features of the cases. Briefly turning to FIG. 2, plot 200 illustrates a two-dimensional feature space containing a population 210 of cases. The two dimensions of the feature space are feature "x" and feature "y". Each case is associated with a particular value for each feature and is shown plotted in the feature space according to those values. A feature space for a population of cases may be much more complex than shown in FIG. 2. For example, cases may be associated with feature vectors representing many more features of the cases. In text classification, for instance, a feature space may include upwards of 1000 features/dimensions.

Cases in population 210 may represent various things. For example, suppose a classifier is to be trained to identify email as either "spam" or "not spare" (a binary classification problem). The cases in the population would be emails. Feature vectors of the cases could represent various features or attributes of the emails. For example, a feature vector of a case may represent the number of words in the email, the number of misspelled words in the email, the number of times particular words appear in the email (e.g., the word "free"), whether the email contained a salutation (e.g., where this feature is represented in the feature vector with a binary value), and many others.

A classifier may be developed for the purpose of appropriately classifying cases in the case population. The classifier may be a categorical classifier or a regressor. In case population 210, the cases are depicted as being classified as positive (±) or negative (−) (a categorical classification problem). Case 220 is an example of a positive case, while case 230 is an example of a negative case. These designations are intended to correspond with the manner in which the cases should be classified by a classifier (or, the manner in which the cases should be labeled). For example, case 220 may be an email that should be classified as "spam", while case 230 may be an email that should be classified as "not spam". Dotted line 240 illustrates a decision boundary that may be associated with a classifier. A decision boundary represents the function learned by a classifier for the purpose of classifying cases in a particular distribution. Although plot 200 represents a binary classification problem, a classification problem may involve multiple potential classes. For example, a multi-class classification problem may be identifying a type of flower represented by each case in a case population. The cases in the case population in such an example could be images of flowers or descriptions of flowers.

Cases in case population 210 may be labeled or unlabeled. Cases may be labeled in order for the classifier to learn or be tested on them. A case is considered to be labeled if it has already been classified by an expert (e.g., a particular email being labeled as "spam" or "not spam"). An expert may be a person or a computer. For example, an expert may be a person with a particular expertise or training in a specific domain to which the cases relate. This person may assign the appropriate classification to cases. The expert may also be a person without particular expertise or training in the specific domain to which the cases relate. The expert may also be a program executed by a computer. For example, the expert may be a classifier that has been trained to label cases. In the case where the cases were intentionally generated for development of a classifier, the cases may be assigned a label at the time of generation. On the other hand, if the cases have not been classified by an expert, the cases are considered to be unlabeled. In such a case, selected cases may be labeled by an expert after they have been selected.

Cases may be selected from a population in various ways. Cases may be selected randomly or non-randomly. Various non-random sampling techniques exist. For example, cases may be sampled using an active learning technique. An active learning technique selects cases from a population based on one or more characteristics of the cases. For instance, an active learning algorithm may be designed to select cases in a population whose features place the case near a decision boundary of the classifier. Such cases may be selected because cases near the decision boundary are, by definition, more difficult to classify, and so the accuracy of the classifier may be improved by requesting the classification of those cases. Another technique for non-random sampling is user-specified selection of cases. For example, if the cases in the population are textual, the user may perform a search to identify cases having a particular keyword. Similarly, the user may search cases based on other attributes, such as particular numerical values associated with features of the cases, or the like.

When selecting cases for a test set, it can be advantageous to select cases that are likely to increase the utility of the test set. A test set can be used to determine an estimate of the generalization error of the classifier being tested. The generalization error indicates how well the classifier is expected to perform on cases unseen during training of the classifier. Having an estimate of the generalization error can be useful for determining which of various classifier models (e.g., Support Vector Machine, naïve Bayes, neural network, etc.) to use, which parameter tuning may be most effective, and whether a given classifier is ready to be deployed into a production environment.

To determine which cases to select from case population 210 to add to the test set, a plurality of bins may be defined. FIG. 2 illustrates twelve bins 250 defined along the x axis of the feature space. The boundaries of bins 250 are thus defined using the values of feature "x" in the feature space. Accordingly, whether a case in population 210 falls within a particular bin depends on the value of feature "x" in the feature vector of the case.

A feature may be selected for defining the plurality of bins for various reasons. For example, a feature may be selected because a classifier has exhibited the greatest variation in classification error (e.g., misclassification) across the bins based on that feature. Bins may be defined for a feature space of a case population based on other methods and rationales. For example, the bins may be defined based on a soft score output of the classifier for each case. Whether the soft score is used or a single continuous feature, the distribution of values may be divided into equal width bins, equally populated bins, or unequal sized bins according to one of a variety of single-dimension discretization algorithms. As another example, the bins may be defined by applying a multi-dimensional discretization algorithm and/or a clustering algorithm to feature vectors of the case. The discretization and clustering may be performed according to various techniques, based on one or more features of the cases.

Returning to FIG. 1, at 120, a set of cases may be divided into the plurality of bins. The set of cases may include labeled cases. For example, the set of cases may include the current set of labeled cases. The set of cases may also include a set of unlabeled cases in the case population that are accessible. The set of cases may be divided into the plurality of bins using the technique used to define the plurality of bins. In an example, where there are cases in the case population that are not accessible, information regarding how the cases correspond to the plurality of bins may be determined using information regarding the distribution of the cases in the population, such as a from a histogram. Additionally, in some examples this information may be obtained from an outside source, such as a third party that controls the case population.

At 130, an obverse weight for a bin may be determined. The obverse weight m may be determined based on an importance weight w of the bin and a variance v of an error estimate of the bin. As described in more detail with respect to FIG. 3, the importance weight indicates an importance of a particular region of a case population (i.e., a bin) based on a measure of how many cases are in that region. The variance of the bin may be a variance of an error estimate r associated with a bin. The error estimate may be the error estimate of a classifier on the set of labeled cases in the bin. Other measures of accuracy may be used as the error estimate. For example, other measures of accuracy for a categorical classifier are 0/1 accuracy, F-measure, area under the ROC curve, and the like. Other measures of accuracy for a regressor are mean squared error, mean absolute error, and the like, where a label corresponds to a number. The variance may be determined using various methods known in the art, such as the square of the standard error of the error estimate, or the Agresti-Coull Interval method.

There are various methods of determining the obverse weight based on the importance weight and the variance. In an example, the obverse weight for the bin may be determined by multiplying the square of the importance weight of the bin by the variance of the bin (i.e., $m=w^2 \cdot v$). In other examples, the importance weight may not be squared, the standard deviation may be used instead of the variance (i.e., $\sqrt{v}$), one or more of the values may be multiplied by a scalar, the importance weight and variance may be added instead of multiplied, and the like.

Figure 3A:
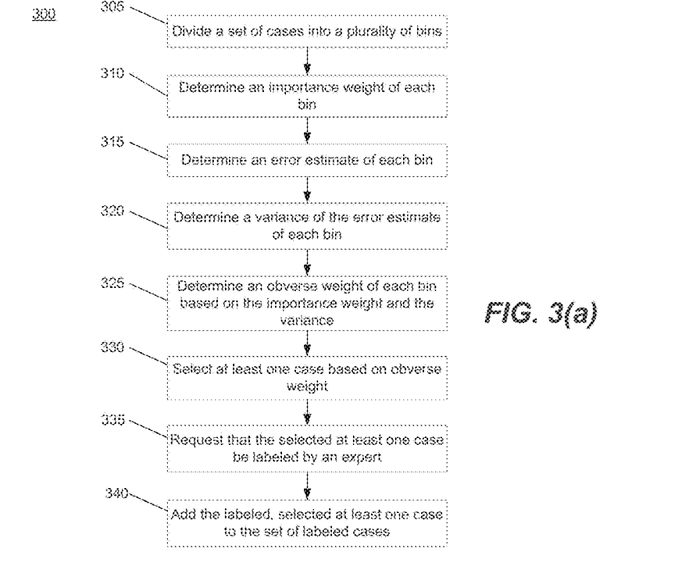
Figure 3B:
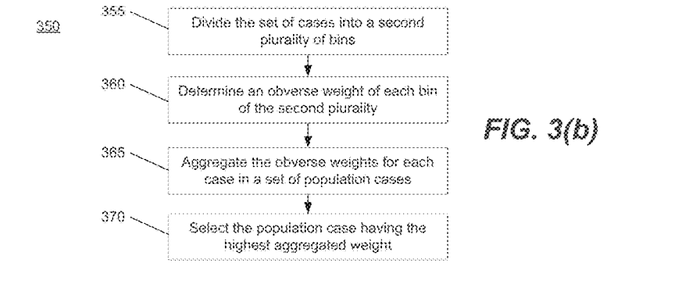
Figure 4:
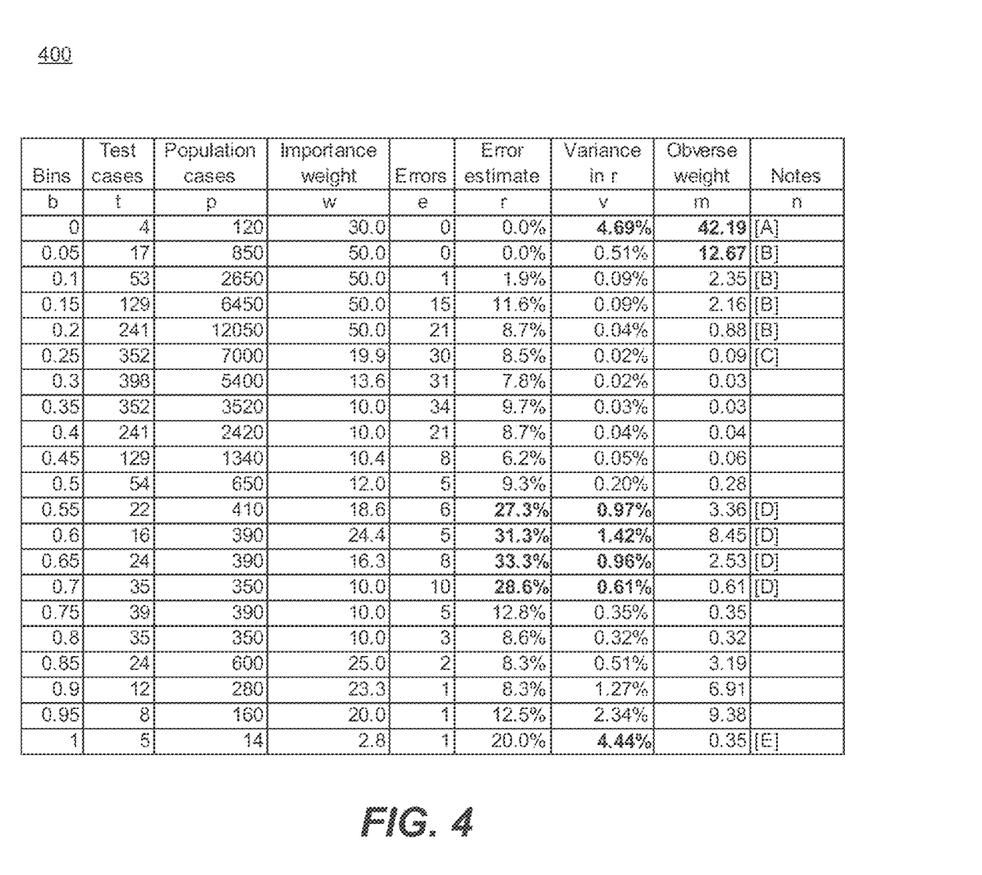
FIG. 4 depicts a working example to illustrate evaluating bins based on obverse weights, according to an example.

As explained in more detail relative to FIGS. 3(a), 3(b), and 4, an improved estimate of the generalization error may be obtained by using obverse weights. For example, the obverse weight may be determined for each bin of the plurality of bins. The obverse weights of the plurality of bins may then be used to select one or more cases from the case population. For instance, cases may be sampled from bins having a high obverse weight. The selected cases may be labeled (if needed) and added to the set of labeled cases to yield an augmented set of labeled cases. The augmented set of labeled cases may be used as a test set to test the performance of the classifier. A new estimate of the generalization error of the classifier may then be determined. For instance, the new estimate may be determined by calculating a weighted average of the number of errors generated by a classifier on the augmented set of labeled cases. The average may be weighted by weighting the number of errors corresponding to a bin by the importance weight of the bin.

By selecting additional cases for a test set based on the obverse weight, portions of the case population more likely to impact the accuracy of the estimate of the generalization error may be included in the test set. As a result, a person may be more confident in the estimate of the generalization error of a classifier intended for production. Furthermore, since the case selection may be more efficient (e.g., the selected cases are expected to improve the estimate of the generalization error more quickly), fewer cases may be required to achieve an appropriate estimate. Accordingly, the time, expense, and difficulty associated with obtaining labeled cases may be reduced.

As shown in FIGS. 3(a) and 3(b), method 100 may be expanded in various ways, according to various examples. Methods 300, 350 may be performed by a computing device, system, or computer, such as computing system 500 or computer 600. Computer-readable instructions for implementing methods 300, 350 may be stored on a computer readable storage medium. These instructions as stored on the medium are referred to herein as "modules" and may be executed by a computer.

Method 300 may begin at 305, where a set of cases may be divided into a plurality of bins. This may be similar to 120 of method 100. The plurality of bins may have been previously defined, as in 110 of method 100. At 310, an importance weight of each bin may be determined. The importance weight of a bin may be determined in various ways. For example, the importance weight may be determined based on a proportion of population cases in the bin. The proportion of population cases may be determined by comparing an actual or estimated number of cases within the boundaries of the bin to an actual or estimated number of cases in the entire case population. The actual or estimated number of cases may be determined in various ways, such as via counting, via a histogram, via a third party resource having data on the case population, or the like. Another example of the importance weight of a bin can be determined by dividing a determined number or proportion of population cases in the bin by a determined number or proportion of labeled cases in the bin. This measure of importance weight may indicate how well the set of labeled cases covers each bin. For example, if a first bin has 100 population cases and 1 labeled case, and a second bin has 10 population cases and 2 labeled cases, the importance weight for the first bin (i.e., w=10) is higher than the importance weight of the second bin (i.e., w=5). Other methods of determining the importance weight may be used as well.

At 315, an error estimate of each bin may be determined. The error estimate of a bin may be determined in various ways. In one example, a number of errors generated by a classifier on the labeled cases in the bin may be determined. The number of errors may then be divided by the number of labeled cases in the bin to yield an error estimate. Other measures of accuracy may be used as the error estimate, as described previously. At 320, the variance of the error estimate may be determined, as previously described relative to method 100.

At 325, an obverse weight of each bin may be determined based on the importance weight and the variance. The obverse weight may be determined in various ways, such as described relative to 130 of method 100. At 330, at least one case may be selected based on obverse weight. For example, the obverse weights of the plurality of bins may be used to select one or more cases from the case population. For instance, one or more cases may be sampled from a bin having a highest obverse weight. As another example, one or more cases may be sampled from several bins have high obverse weights. In another example, a plurality of cases may be sampled from the bins according to a probability distribution based on the obverse weights of the bins. The obverse weight may be used in other ways to sample cases from the population.

At 335, it may be requested that the selected at least one case be labeled. In particular, if the selected at least one case is unlabeled, labeling can facilitate using the case for testing a classifier. Labeling can be requested of an expert, as described previously. Labels may also be obtained from a third party source. For example, an owner of the case population may offer for sale labels for cases in the population. If the case is already labeled, and the label is accessible to the classifier, 335 may be skipped. At 340 the labeled, selected at least one case may be added to the set of labeled cases. The set of labeled cases may then be used for testing the classifier. 310-340 may be repeated multiple times to add more cases to the set of labeled cases over multiple iterations.

Method 350 illustrates a variation in which a second plurality of bins is used to determine a second obverse weight for cases in the case population. Method 350 may begin at 355, where the set of cases may be divided into a second plurality of bins. The second plurality of bins may be defined, similar to 110 of method 100, according to one or more different characteristics or combinations of characteristics of cases in the population (different relative to the first plurality of bins). For example, referring to FIG. 2, instead of defining a plurality of bins based on feature "x", the second plurality of bins may be defined based on feature "y". Alternatively, the second plurality of bins may be defined on the output of a classifier on population 210. Various techniques, as described relative to FIG. 1, may be used to define the second plurality of bins and divide the set of cases into the second plurality of bins.

At 360, an obverse weight of each bin of the second plurality of bins may be determined. The obverse weight may be determined as described previously relative to 130 of method 100 and 325 of method 300. At 365, the obverse weights for each case in a set of population cases may be aggregated. For example, for each case in the set of population cases, the obverse weight of the bin of the first plurality of bins corresponding to that case and the obverse weight of the bin of the second plurality of bins corresponding to that case may be aggregated together. The aggregation may take the form of addition, multiplication, or any other method. At 370, one or more population cases may be selected based on the aggregated obverse weight of each case. For example, one or more cases having high aggregated obverse weights may be selected. The selected one or more cases may be labeled (if necessary) and added to the set of labeled cases. In some examples, additional pluralities of bins may be defined for determining additional obverse weights of population cases.

FIG. 4 depicts a working example to illustrate evaluating bins based on obverse weights, according to an example. 21 bins have been defined based on a feature varying between 0 and 1. A distribution across the bins of a set of test cases t and a set of population cases p is shown. Test cases are also considered to be population cases. The importance weight w is calculated as follows: w=pit. The number of errors e represents the number errors generated by a classifier on the test cases t. The error estimate is calculated as follows: r=e/t. The variance is calculated as follows: $v=p*(1-p)/t$, where $p=(e+2)(t+4)$. The obverse weight is calculated as follows: $m=w^2*v$.

Notes n are used here merely to highlight some of the bins to illustrate how the obverse weight may result in a different outcome than if only importance weights, for example, were used to select additional cases for testing. Note [A] highlights a bin where the importance weight is not the highest, but where there is a large degree of uncertainty (as indicated by the variance). The obverse weight considers these two indications and indicates that it is relatively important to sample at least one additional case from this bin. Indeed, this bin has the highest obverse weight, which places more importance on this bin than the importance weight alone does.

Note [B] highlights four bins that all have the same importance weight. However, the obverse weight varies, thus providing an order of preference for sampling purposes. Additionally, some of these bins have a much lower obverse weight relative to other bins even though the importance weight is the highest.

Note [C] highlights a bin where, although the importance weight is relatively high, the obverse weight is low, reflecting the certainty of our error estimate. Note [D] highlights several bins where the variance is very high, but where the importance weight differs widely. Again, the obverse weight reflects both of these indications in such a way that an appropriate sampling considering both characteristics can be made. Note [E] highlights a bin where there is a high degree of uncertainty in the error estimate (i.e., high variance), but where the uncertainty is less important due to the low number of population cases. In summary, using the obverse weight enables one to focus on sampling case(s) for a test set that are likely to have a greater influence on the estimate of the generalization error of a classifier.

Figure 5:
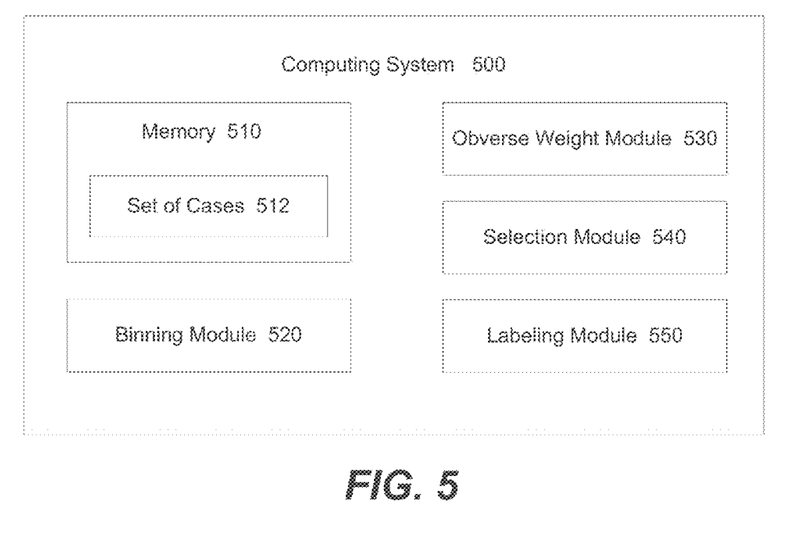
FIG. 5 illustrates a system for determining an obverse weight, according to an example.

FIG. 5 illustrates a system for determining an obverse weight, according to an example. Computing system 500 may include and/or be implemented by one or more computers. For example, the computers may be server computers, workstation computers, desktop computers, or the like. The computers may include one or more controllers and one or more machine-readable storage media.

A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, computing system 500 may include one or more machine-readable storage media separate from the one or more controllers, such as memory 510.

Computing system 500 may include memory 510, binning module, 520, obverse weight module 530, selection module 540, and labeling module 550. Each of these components may be implemented by a single computer or multiple computers. The components may include software, one or more machine-readable media for storing the software, and one or more processors for executing the software. Software may be a computer program comprising machine-executable instructions.

In addition, users of computing system 500 may interact with computing system 500 through one or more other computers, which may or may not be considered part of computing system 500. As an example, a user may interact with system 500 via a computer application residing on system 500 or on another computer, such as a desktop computer, workstation computer, tablet computer, or the like. The computer application can include a user interface.

Computer system 500 may perform methods 100, 300, 350, and variations thereof, and components 520-550 may be configured to perform various portions of methods 100, 300, 350, and variations thereof. Additionally, the functionality implemented by components 520-550 may be part of a larger software platform, system, application, or the like. For example, these components may be part of a data analysis system.

In an example, memory 510 may be configured to store a set of cases 512. Binning module 520 is configured to divide the set of cases into a plurality of bins. Obverse weight module 530 is configured to determine an obverse weight of each bin of the plurality of bins based on an importance weight of the bin and a variance of an error estimate of the bin. The obverse module 530 may be configured to determine the obverse weight of a bin by multiplying the square of the importance weight of the bin by the variance of the error estimate of the bin. Selection module 540 may be configured to select for labeling a case from one of the plurality of bins based on the obverse weights of the plurality of bins. Additionally, in an example, labeling module 550 may be configured to assign a label to the selected case and add the labeled cases to a set of test cases. In other examples, the labeling module 550 may be configured to request that a selected case be labeled, such as by an expert.

Figure 6:
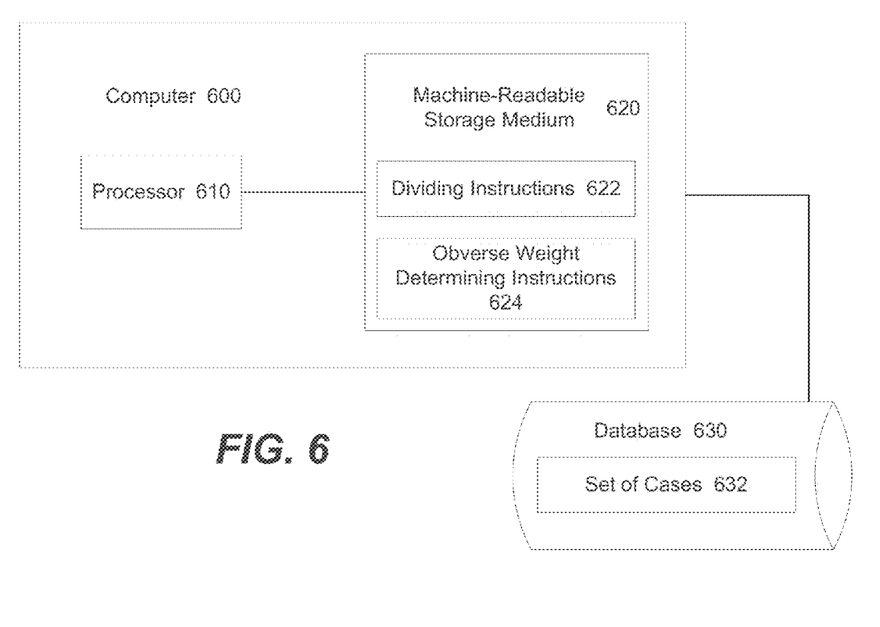
FIG. 6 illustrates a computer-readable medium for determining an obverse weight, according to an example.

FIG. 6 illustrates a computer-readable medium for determining an obverse weight, according to an example. Computer 600 may be any of a variety of computing devices or systems, such as described with respect to computing system 500.

Computer 600 may have access to database 630. Database 630 may include one or more computers, and may include one or more controllers and machine-readable storage mediums, as described herein. Computer 600 may be connected to database 630 via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

Processor 610 may be at least one central processing unit (CPU), at least one semiconductor-based microprocessor, other hardware devices or processing elements suitable to retrieve and execute instructions stored in machine-readable storage medium 620, or combinations thereof. Processor 610 can include single or multiple cores on a chip, multiple cores across multiple chips, multiple cores across multiple devices, or combinations thereof. Processor 610 may fetch, decode, and execute instructions 622, 624 among others, to implement various processing. As an alternative or in addition to retrieving and executing instructions, processor 610 may include at least one integrated circuit (IC), other control logic, other electronic circuits, or combinations thereof that include a number of electronic components for performing the functionality of instructions 622, 624. Accordingly, processor 610 may be implemented across multiple processing units and instructions 622, 624 may be implemented by different processing units in different areas of computer 600.

Machine-readable storage medium 620 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile. Random Access Memory (NVRAM), an Electrically Erasable Programmable Read-Only Memory (EE-PROM), a storage drive, a NANO flash memory, and the like. Further, the machine-readable storage medium 620 can be computer-readable and non-transitory. Machine-readable storage medium 620 may be encoded with a series of executable instructions for managing processing elements.

The instructions 622, 624 when executed by processor 610 (e.g., via one processing element or multiple processing elements of the processor) can cause processor 610 to perform processes, for example, methods 100, 300, 350, and variations thereof. Furthermore, computer 600 may be similar to computing system 500 and may have similar functionality and be used in similar ways, as described above. For example, dividing instructions 622 may cause processor 610 to divide the set of cases 632 into a plurality of bins. Obverse weight determining instructions 624 may cause processor 610 to determine an obverse weight for a bin of the plurality of bins based on an importance weight of the bin and a variance of an error estimate of the bin.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method, comprising:
   defining a plurality of bins;
   dividing a set of labeled cases into the plurality of bins; and
   determining an obverse weight for a bin of the plurality of bins based on (1) an importance weight of the bin and (2) a variance of an error estimate of a classifier on the set of labeled cases in the bin.

2. The method of claim 1, further comprising:
   determining an obverse weight for each bin of the plurality of bins;
   selecting at least one case from a plurality of population cases based on the obverse weights of the plurality of bins; and
   adding the selected at least one case to the set of labeled cases to yield an augmented set of labeled cases.

3. The method of claim 2, further comprising:
   determining an estimate of a generalization error of the classifier by calculating a weighted average of the number of errors generated by the classifier on the augmented set of labeled cases, weighted by the importance weight of each bin.

4. The method of claim 2, wherein selecting the at least one case is performed by selecting the case from a bin of the plurality of bins having the highest obverse weight.

5. The method of claim 2, wherein selecting the at least one case is performed by selecting the case from the plurality of bins according to a probability distribution based on the obverse weights of the plurality of bins.

6. The method of claim 2, further comprising:
   requesting that the selected at least one case be labeled by an expert before adding it to the set of labeled cases.

7. The method of claim 1, wherein determining the obverse weight for the bin is performed by multiplying the square of the importance weight of the bin by the variance of the bin.

8. The method of claim 1, further comprising determining the importance weight of the bin based on a proportion of population cases in the bin.

9. The method of claim 8, wherein determining the importance weight of the bin is performed by dividing a determined number of population cases in the bin by a determined number of labeled cases in the bin.

10. The method of claim 1, further comprising determining the error estimate of the classifier on the labeled cases in the bin by:
    determining a number of errors generated by the classifier on the labeled cases in the bin; and
    dividing the number of errors by the number of labeled cases in the bin.

11. The method of claim 1, further comprising:
    selecting a feature of the set of labeled cases having a greatest variation in classification error across the bins,
    wherein dividing the set of labeled cases into bins is performed based on a value of the selected feature for each case.

12. The method of claim 1, wherein dividing the set of labeled cases into bins is performed by applying at least one of a multi-dimensional discretization algorithm and a clustering algorithm to feature vectors of the cases.

13. The method of claim 1, wherein dividing the set of labeled cases into bins is performed based on an output of the classifier for each case.

14. The method of claim 1, further comprising:
    determining an obverse weight for each bin of the plurality of bins;
    defining a second plurality of bins;
    dividing the set of labeled cases into a second plurality of bins;
    determining a second obverse weight of each bin of the second plurality of bins;
    for each case in a set of population cases, aggregating the case's obverse weight and second obverse weight; and
    adding the population case having the highest aggregated obverse weight to the set of labeled cases.

15. A system, comprising:
    a binning module to divide a set of cases into a plurality of bins;
    an obverse weight module to determine an obverse weight of each bin of the plurality of bins based on an importance weight of the bin and a variance of an error estimate of the bin; and
    a selection module to select for labeling a case from one of the plurality of bins based on the obverse weights of the plurality of bins.

16. The system of claim 12, further comprising:
    a labeling module to assign a label to the selected case and add the labeled case to a set of test cases.

17. The system of claim 12, wherein the obverse weight module is configured to determine the obverse weight of each bin by multiplying the square of the importance weight of the bin by the variance of the error estimate of the bin.

18. A non-transitory computer readable storage medium storing instructions that, when executed by a processor, cause a computer to:
divide a set of cases into a plurality of bins; and
determine an obverse weight for a bin of the plurality of bins based on an importance weight of the bin and a variance of an error estimate of the bin.

* * * * *